UNITED STATES PATENT OFFICE.

LUDWIG CLAISEN, OF GODESBERG, NEAR BONN, GERMANY, ASSIGNOR TO SYNTHETIC PATENTS CO., INC., OF NEW YORK, N. Y., A CORPORATION OF NEW YORK.

C-ALLYL SALICYLIC ACID.

1,094,123.     Specification of Letters Patent.     Patented Apr. 21, 1914.

No Drawing.     Application filed October 29, 1913. Serial No. 798,055.

*To all whom it may concern:*

Be it known that I, LUDWIG CLAISEN, doctor of philosophy, professor of chemistry, citizen of the German Empire, residing at Godesberg, near Bonn-on-the-Rhine, Germany, have invented new and useful Improvements in C-Allyl Salicylic Acid, of which the following is a specification.

I have found that the hitherto unknown C-ortho-allyl-salicylic acid being a valuable antipyretic having most probably the formula:

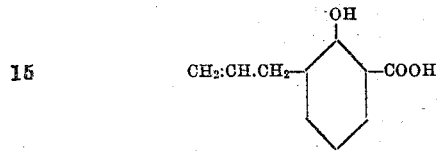

can be obtained by heating the O-allylsalicylic-acid-ester and saponifying the resulting C-allylsalicylic-acid-ester. The reaction proceeds in accordance with the following equation:

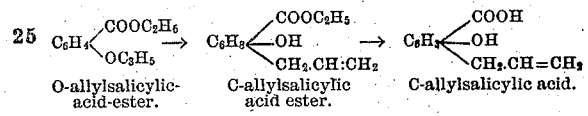

O-allylsalicylic-acid-ester.    C-allylsalicylic acid ester.    C-allylsalicylic acid.

The new C-allylsalicylic acid crystallizes from dilute methyl alcohol in the shape of colorless needles melting at 96° C. Its aqueous or alcoholic solution is colored violet by a ferric chlorid solution.

In order to illustrate my new process the following example is given, the parts being by weight:—O-allylsalicylic-acid-ethyl-ester, which is a colorless oil boiling at 153° C. under a pressure of 13 mm., is heated in an oil bath during one hour to 230° C. and the resulting mass is distilled. The C-allylsalicylic-acid-ethyl-ester passes over at 270-278° C. It boils *in vacuo* (12 mm.) at 142° C. Its alcoholic solution is colored blue-violet with ferric chlorid. For the saponification the ester is heated during half an hour with the equal quantity by weight of a 30 per cent. solution of KOH in alcohol and the resulting oil is extracted with a mixture of ether with chloroform.

I claim:—

The new C-allyl-salicylic acid having most probably the formula:

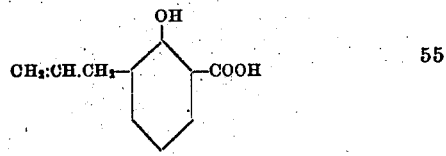

crystallizing from dilute methyl alcohol in the shape of needles melting at 96° C.; its alcoholic solution being colored violet with ferric chlorid; forming esters with alcohols; and being a valuable antipyretic, substantially as described.

In testimony whereof I have hereunto set my hand in the presence of two subscribing witnesses.

LUDWIG CLAISEN.

Witnesses:
   EDWARD FERTIG,
   HANS BRÜCKNER.